UNITED STATES PATENT OFFICE 2,658,915

N-ALKYL-N-VINYL CYANAMIDE PREPARATION

Donald W. Kaiser, Old Greenwich, and Ingenuin Hechenbleikner, Norwalk, Conn., assignors to American Cyanamid Company, New York, N. Y., a corporation of Maine No Drawing. Application October 24, 1951, Serial No. 253,001

4 Claims. (Cl. 260—551)

The present invention relates to a new method of preparing the N-vinyl-N-alkyl cyanamides.

According to the instant invention, an N-haloethyl-N-alkyl cyanamide is reacted with an alkali metal tertiary alcoholate, according to the following equation:

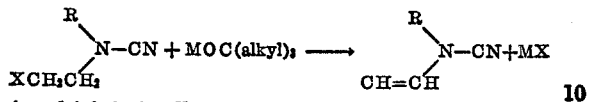

in which R is alkyl, X is chlorine or bromine, and M is alkali metal.

Prior to the present invention the only method known for preparing the N-vinyl-N-alkyl cyanamides was by degradation of an N-alkyl pyrazine with cyanogen bromide, as reported in Berichte, 59, p. 936 (1926).

The following example illustrates without limiting the invention.

EXAMPLE 1

*Vinylethylcyanamide*

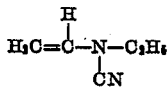

Reagents:
- 2-chloroethylethylcyanamide_ 66 g. (0.5 mole).
- Potassium_____ 19.5 g. (0.5 mole).
- Tert.-Butanol_____ 300 ml.

The potassium was dissolved in the tert.-butanol and the chlorocyanamide compound added to the solution at 80° C. Spontaneous refluxing occurred during the addition. After standing for 30 minutes, 5.0 ml. of water was added to induce crystallization of the potassium chloride, which was then filtered. The filtrate was distilled through a 12" glass-bead-packed column. The tert.-butanol was removed at 100 mm. and the vinyl-ethylcyanamide distilled at 80° C./20 mm. The yield was 18 g. or 40% of theory.

The course of the dehydrohalogenation involved in the reaction is rather surprising, in view of the fact that a primary alcoholate, such as potassium ethylate or potassium n-butylate gives an O-alkyl isourea.

In practicing the invention, various modifications of Example I will be readily apparent to those skilled in the art. Thus, the alcoholate need not be formed in situ, but can be added directly as such. Alcoholates other than potassium can be used, e. g., sodium isoamylate,

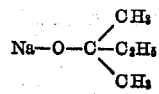

lithium isoheptylate,

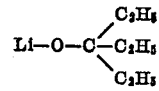

and the like. The solvent must be tertiary alcohol.

The reagents are preferably but not necessarily reacted in equimolar ratio. A considerable excess of either, e. g., 10:1 or 1:10, respectively, does no harm, but merely presents a recovery problem. The materials can be added in any order, but that given in the example is preferred. The reaction temperature can be much lower than 80° C., e. g., as low as 0° C. At such low temperatures, however, many hours are required to complete the reaction. Accordingly, reflux temperatures are much preferable.

The step of adding water to precipitate by-product metal halide is optional. If desired, the N-vinyl-N-alkyl cyanamide product can simply be fractionated from the reaction mass without first removing the halide salt.

The 2-haloethyl alkyl cyanamide starting compounds can be prepared by various general processes well known in the art, of which the following is an example.

*2-chloroethylethylcyanamide*

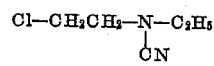

Reagents:
- 2-chloroethylethylamine hydrochloride_____ 129 g. (10 mole).
- Cyanogen chloride_____ 61.5 g. (1.0 mole).
- Calcium hydroxide_____ 73 g. (1.0 mole).
- Water_____ 250 ml.

The calcium hydroxide was suspended in the water and after cooling to 5° C., the amine hydrochloride was added. The cyanogen chloride was then distilled into the ice-cooled solution at such a rate that the temperature did not rise about 15° C. After the addition of the cyanogen chloride (90 minutes), the mixture was poured into a separatory funnel and the top layer separated from the lower aqueous layer. The latter was extracted with benzene and the extract combined with the original layer. This solution was distilled at 0.5 mm., after first removing the benzene at water-pump pressure. The product, 110 g. (83% of the theoretical yield), distilled as a colorless liquid at 75° C./0.5 mm.

The other 2-haloethyl alkyl amine hydrohalides undergo the same reaction with cyanogen chloride or cyanogen bromide.

The N-vinyl-N-alkyl cyanamides are useful in the preparation of synthetic resins (e. g., resinous copolymers), synthetic fibers, surface active agents, and the like.

While the invention has been described with particular reference to specific embodiments, it is to be understood that it is not to be limited thereto but is to be construed broadly and restricted solely by the scope of the appended claims.

We claim:
1. The method of preparing an N-vinyl-N-alkyl cyanamide that comprises subjecting a member of the group consisting of the N-bromoethyl-N-lower alkyl cyanamides and the N-chloroethyl-N-lower alkyl cyanamides to the action of an alcoholate of the formula

MO—C(lower alkyl)$_3$ in which M is alkali metal.

2. The method of preparing N-vinyl-N-ethyl cyanamide according to claim 1 in which the cyanamide reactant is N-chloroethyl-N-ethyl cyanamide and the alcoholate reactant is an alkali metal tert.-butylate.

3. The method according to claim 2 in which the reaction is carried out at a temperature of at least 80° C., using substantially equimolar amounts of reactants, in a solvent comprising an alcohol of the formula HO—C(lower alkyl)$_3$.

4. The method of preparing N-vinyl-N-ethyl cyanamide according to claim 3 is which the alkali metal is potassium, the tertiary alcohol is tertiary butanol and the cyanamide reactant is 2-chloroethylethylcyanamide.

DONALD W. KAISER.
INGENUIN HECHENBLEIKNER.

References Cited in the file of this patent

Braun et al., "Ber. deut. Chem.," vol. 59 (1926), pp. 938 and 945.

Elderfield et al., "J. Org. Chem.," vol. 14 (1949), pp. 608, 626, 627 and 634.